US012719658B2

(12) United States Patent
Ju et al.

(10) Patent No.: US 12,719,658 B2
(45) Date of Patent: *Aug. 25, 2026

(54) ELECTRONIC DEVICE, SERVER DEVICE FOR HANDLING HOMOMORPHIC ENCRYPTED DATA, AND METHODS THEREOF

(71) Applicants: CRYPTO LAB INC., Seoul (KR); SEOUL NATIONAL UNIVERSITY R&DB FOUNDATION, Seoul (KR)

(72) Inventors: Jae Hyung Ju, Seoul (KR); Jaiyoung Park, Seoul (KR); Jung Hee Cheon, Seoul (KR); Jung Ho Ahn, Seoul (KR)

(73) Assignees: CRYPTO LAB INC., Seoul (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 68 days.

This patent is subject to a terminal disclaimer.

(21) Appl. No.: 18/972,318

(22) Filed: Dec. 6, 2024

(65) Prior Publication Data

US 2026/0012327 A1 Jan. 8, 2026

(30) Foreign Application Priority Data

Jul. 5, 2024 (KR) ........................ 10-2024-0089207

(51) Int. Cl.
*G06F 7/04* (2006.01)
*H04L 9/00* (2022.01)
*H04L 9/06* (2006.01)

(52) U.S. Cl.
CPC ............ *H04L 9/008* (2013.01); *H04L 9/0618* (2013.01)

(58) Field of Classification Search
CPC .............................. H04L 9/008; H04L 9/0618
See application file for complete search history.

(56) References Cited

U.S. PATENT DOCUMENTS 11,823,060 B2 * 11/2023 Antic ..................... G06N 3/045
2020/0228307 A1 * 7/2020 Cheon ................... H04L 9/3093
(Continued)

OTHER PUBLICATIONS

Kannivelu et al, A Homomorphic Encryption Based Adaptive Image Filter Using Division Over Encrypted Data, Apr. 20, 2021, IEEE, pp. 67-72. (Year: 2021).*
(Continued)

*Primary Examiner* — Philip J Chea
*Assistant Examiner* — Jenise E Jackson
(74) *Attorney, Agent, or Firm* — Steinfl + Bruno LLP

(57) ABSTRACT

Disclosed is an electronic device. The electronic device includes: a communication unit configured to perform communication with a server device storing an artificial intelligence (AI) model that performs computation in an encrypted state; a memory configured to store a plurality of images; a processor configured to divide each of the plurality of images into a plurality of divided images and list all the divided images in a form of a one-dimensional vector to perform slot encoding, and configured to obtain CinS-encoded data in a form of a frequency signal by performing discrete Fourier transform (DFT) on slot-encoded data in units of slots corresponding to each image and transmit a homomorphic ciphertext obtained by performing homomorphic encryption on the CinS-encoded data to the server device through the communication unit; and a display.

8 Claims, 11 Drawing Sheets

(56) References Cited

U.S. PATENT DOCUMENTS

| | | | | |
|---|---|---|---|---|
| 2021/0119766 | A1* | 4/2021 | Suresh | G09C 1/00 |
| 2024/0097878 | A1* | 3/2024 | Lee | H04L 63/0442 |
| 2024/0171372 | A1* | 5/2024 | Kim | H04L 9/008 |
| 2025/0158799 | A1* | 5/2025 | Ji | H04L 9/008 |

OTHER PUBLICATIONS

Huang et al, Design and Implementation of Big Data Analysis Algorithm in Ciphertext Domain Based on Homomorphic Encryption, Jul. 25, 2021, pp. 144-150. (Year: 2021).*

Hyung Ju, Jae et al. "NeuJeans: Private Neural Network Inference with Joint Optimization of Convolution and Bootstrapping" Publication Date: Dec. 7, 2023. Version 1. 16 pages.

Hyung Ju, Jae et al. "NeuJeans: Private Neural Network Inference with Joint Optimization of Convolution and Bootstrapping" Publication Date: Dec. 7, 2023. Version 2. 15 pages.

* cited by examiner

FIG. 6

| Encoding Method | # of Homomorphic Rotations | Level Consumption |
|---|---|---|
| Slot Encoding | $2f^2 + 2C - 4$ | 1 |
| Coefficient Encoding | $C - 1$ | 1 |
| Ours (CinS Encoding) | $2\sqrt{C} - 2$ | 0 |

ELECTRONIC DEVICE, SERVER DEVICE FOR HANDLING HOMOMORPHIC ENCRYPTED DATA, AND METHODS THEREOF

CROSS-REFERENCE TO RELATED APPLICATION

The present application claims priority to Korean Patent Application No. 10-2024-0089207 filed on Jul. 5, 2024 and incorporated herein by reference in its entirety. The present application is also related to Korean Patent Application No. 10-2024-0180689 filed on the same day of the present application, Dec. 6, 2024, and incorporated herein by reference in its entirety.

BACKGROUND

1. Field

Apparatuses and methods consistent with the disclosure relate to an electronic device, a server device, and a data processing method thereof.

2. Description of the Related Art

In accordance with the development of an electronic technology, various types of electronic devices have been developed. Such electronic devices may provide various services for a user while performing communication with various external devices including a server device.

One of the services may be a medical service. A user may transmit an image such as an X-ray image, a computed tomography (CT) scan image, or an image of a lesion taken directly using a mobile phone of the user to an external device, and a user (for example, a doctor) of the external device may transmit a diagnosis result thereof. Recently, with the development of an artificial intelligence (AI) technology, it is possible to receive a diagnosis result of an AI model by transmitting various images to a server device where the AI model is stored without a professional, such as a doctor, directly performing diagnosis.

In order to use such a service, the user needs to provide various images related to himself or herself to an external server device. In this case, there is a possibility that the images may be leaked and exploited during a process of transmitting the images to the server device or by an administrator of the server device.

One of the solutions to solve such a problem may be a homomorphic encryption technology. According to the homomorphic encryption technology, computation may be performed in a state in which data is encrypted, and thus, there is no risk that an external third party may grasp a content of the data.

However, for the image-type data described above, a considerable overhead may occur when performing computation in a homomorphically encrypted state on the server device.

Accordingly, a need for an appropriate encryption processing technology for images has arisen.

SUMMARY

The disclosure has been made in an effort to solve the above-described problems, and the disclosure provides an electronic device, a server device, and data processing methods for efficiently performing computation based on an image in an encrypted state.

An electronic device according to at least one embodiment of the disclosure includes: a communication unit configured to perform communication with a server device storing an artificial intelligence (AI) model that performs computation in an encrypted state; a memory configured to store a plurality of images; a processor configured to divide each of the plurality of images into a plurality of divided images and list all the divided images in a form of a one-dimensional vector to perform slot encoding, and configured to obtain CinS-encoded data in a form of a frequency signal by performing discrete Fourier transform (DFT) on slot-encoded data in units of slots corresponding to each image and transmit a homomorphic ciphertext obtained by performing homomorphic encryption on the CinS-encoded data to the server device through the communication unit; and a display, in which the processor is configured to based on an encryption computation result of the AI model for the homomorphic ciphertext is received through the communication unit, decode the encryption computation result and display the decoded encryption computation result on the display.

A server device according to at least one embodiment of the disclosure includes: a communication unit configured to perform communication with an electronic device; a memory configured to store an AI model for performing computation in an encrypted state and a model parameter of the AI model; and a processor, in which the processor is configured to based on a homomorphic ciphertext obtained by performing CinS encoding on a plurality of images and then performing homomorphic encryption is received from the electronic device through the communication unit, obtain an encryption computation result by inputting the homomorphic ciphertext to the AI model and transmit the encryption computation result to the electronic device through the communication unit, and wherein the AI model performs depth-wise convolutional computation or convolutional computation using the model parameter.

The processor may be configured to obtain a result of the depth-wise convolutional computation by performing convolutional computation with each slot of the homomorphic ciphertext by using the model parameters whose number corresponds to the number of entire slots of the received homomorphic ciphertext.

Alternatively, the processor may be configured to perform the convolutional computation by using a plurality of model parameters corresponding to a plurality of output channels of the AI model and entire slots of the received homomorphic ciphertext based on a mathematical formula $$Bi = \sum_{k=1}^{n} Ak * Wk^{i},$$

in which B represents a result of the convolutional computation, Ak represents data of a k-th slot, i represents the output channel, $Wk^i$ represents a k-th model parameter of an i-th output channel, and n represents the number of entire slots.

A data processing method of an electronic device according to at least one embodiment of the disclosure includes: dividing each of a plurality of images into a plurality of divided images and listing all the divided images in a form of a one-dimensional vector to perform slot encoding;

obtaining CinS-encoded data in a form of a frequency signal by performing DFT on slot-encoded data in units of slots corresponding to each image; obtaining a homomorphic ciphertext by performing homomorphic encryption on the CinS-encoded data; transmitting the homomorphic ciphertext to a server device storing an AI model that performs computation in an encrypted state; and based on an encryption computation result of the AI model for the homomorphic ciphertext is received, decoding the encryption computation result.

A data processing method of a server device according to at least one embodiment of the disclosure includes: based on a homomorphic ciphertext obtained by performing CinS encoding on a plurality of images and then performing homomorphic encryption is received from an electronic device, obtaining an encryption computation result by inputting the homomorphic ciphertext to an AI model that performs computation in an encrypted state; and transmitting the encryption computation result to the electronic device, in which the AI model performs depth-wise convolutional computation or convolutional computation using a model parameter.

The obtaining of the encryption computation result may include obtaining a result of the depth-wise convolutional computation by performing convolutional computation with each slot of the homomorphic ciphertext by using the model parameters whose number corresponds to the number of entire slots of the received homomorphic ciphertext.

The obtaining of the encryption computation result may include performing the convolutional computation by using a plurality of model parameters corresponding to a plurality of output channels of the AI model and entire slots of the received homomorphic ciphertext based on a mathematical formula $$Bi = \sum_{k=1}^{n} Ak * Wk^i,$$

in which B represents a result of the convolutional computation, Ak represents data of a k-th slot, i represents the output channel, $Wk^i$ represents a k-th model parameter of an i-th output channel, and n represents the number of entire slots.

According to the various embodiments of the disclosure described above, computation may be efficiently performed on an image using an AI model that performs the computation in an encrypted state, thereby reducing excessive operation burden and guaranteeing personal privacy.

BRIEF DESCRIPTION OF THE DRAWINGS

FIG. 6 is a table illustrating an effect when CinS encoding is performed according to an embodiment of the disclosure.

DETAILED DESCRIPTION

In an information (data) transmission process performed in the disclosure, encryption/decryption may be applied as needed. In the disclosure and claims, expressions describing the information (data) transmission process are to be construed as including the case of performing encryption/decryption, even if not mentioned separately. Expressions such as "transmit (transfer) from A to B" or "receive by A from B" in the disclosure include transmission (transfer) or reception of another medium in between, and do not just represent direct transmission (transfer) from A to B or direct reception by A from B.

In the description of the disclosure, the order of each step should be understood to be non-limiting, unless the preceding step must be performed logically and temporally before the following step. In other words, except for the exceptional case above, even if the process described in the following step is performed before the process described in the preceding stage, the nature of the disclosure is not affected and the scope of the right should be defined regardless of the order of the steps. Further, in the specification, "A or B" is defined to mean not only selectively indicating either one of A and B, but also including both A and B. In the disclosure, the term "including" has a meaning encompassing further including other components in addition to the included elements listed.

In the disclosure, only essential components necessary for the description of the disclosure are described, and components unrelated to the essence of the disclosure are not mentioned. Further, it should not be interpreted as an exclusive meaning that includes only the mentioned components, but should be interpreted as a non-exclusive meaning that may include other components.

In the disclosure, the term "value" is defined as including not only a scalar value but also a vector.

A mathematical computation and calculation of each step of the disclosure to be described later may be implemented by a computer operation by a well-known coding method for carrying out the computation or the calculation, and/or coding designed suitable for the disclosure.

Specific mathematical formulas described below are exemplarily described among various possible alternatives, and the scope of the disclosure should not be construed as being limited to the mathematical formulas mentioned in the disclosure.

For convenience of explanation, the following notations will be used in the disclosure.

$a \leftarrow D$: Select element (a) according to distribution (D)

$s1, s2 \in R$: Each of $S_1$ and $S_2$ is an element of a set R.

mod(q): Perform modular computation by an element q $\lfloor \cdot \rceil$: Round up an internal value Hereinafter, various embodiments of the disclosure will be described in detail with reference to the accompanying drawings.

Figure 1:
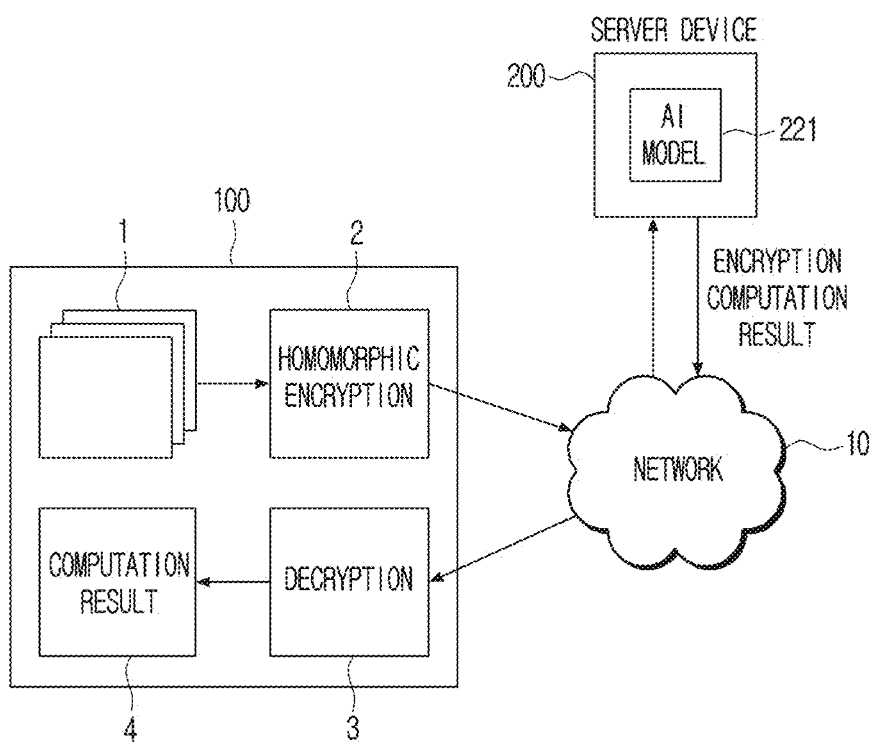
FIG. 1 is a diagram for describing operations of an electronic device and a server device according to at least one embodiment of the disclosure.

FIG. 1 is a diagram for describing operations of an electronic device and a server device according to at least one embodiment of the disclosure.

Referring to FIG. 1, an electronic device 100 and a server device 200 may perform communication with each other through a network 10. The network 10 may be implemented by various types of wired and wireless communication networks, a broadcasting communication network, an optical communication network, a cloud network, or the like, and the respective devices may be connected to each other by a method such as wireless fidelity (Wi-Fi), Bluetooth, and near field communication (NFC), without a separate medium.

Although FIG. 1 illustrates one electronic device 100, the electronic device 100 may be implemented in a plurality of different types. For example, the electronic device 100 may be various types of devices such as a smartphone, a tablet, a personal computer (PC), a laptop PC, a home server, a kiosk, a game player, and a camera. In addition, the electronic device 100 may be implemented in the form of a home appliance to which an Internet of Things (IoT) function is applied. In a case where the electronic device 100 includes a camera, the electronic device 100 may directly capture and acquire at least one image 1. In a case where the electronic device 100 does not include a camera, the electronic device 100 may receive and store the image 1 from an external device (for example, a camera or a memory stick) through various wired or wireless interfaces. In various embodiments of the disclosure, the image 1 may be a photographic image, but is not necessarily limited thereto, and may be a graphic image. Alternatively, the image 1 may be a video content including a plurality of image frames.

The electronic device 100 may perform homomorphic encryption 2 on at least one image to acquire a homomorphic ciphertext, and then transmit the homomorphic ciphertext to the server device 200 through the network 10.

For example, in a case where a captured image, an X-ray image, a computed tomography (CT) image, or the like of a body of a user is stored in the electronic device 100, the user may want to obtain a diagnosis result based on the image by transmitting the image to the external server device 200.

In this case, there is a possibility that the image 1 may be hacked and leaked to the outside during a transmission process or may be leaked by an administrator of the server device 200. However, in a case where the image is transmitted in the form of a homomorphic ciphertext, the image may not be identified even in a case where the image is leaked to the outside. Therefore, security of personal information or physical characteristics of the user may be enhanced.

There may be various homomorphic encryption algorithms for generating the homomorphic ciphertext, but various embodiments of the disclosure will be described based on a case where the homomorphic encryption is performed using a CKKS scheme or a modified algorithm based on the CKKS scheme.

The electronic device 100 may perform encoding to transmit the image in the form of a homomorphic ciphertext. In the homomorphic encryption, the encoding may be a task of converting data into an encryptable format. The homomorphic encryption is based on a mathematical structure (for example, polynomial computation). Therefore, for the image 1, the homomorphic encryption may be performed after converting the image 1 into a form that may be processed by the homomorphic encryption algorithm.

In the homomorphic encryption, slot encoding and coefficient encoding may be generally used.

The slot encoding is a method of allocating data to be encrypted to a plurality of slots and then encoding the data in units of entire slots. A slot refers to a data unit that may be stored in parallel in one homomorphic ciphertext. In a case where the ciphertext is expressed in a polynomial form, coefficients or roots of the polynomial may act as each slot. In a case where one ciphertext includes a total of n slots, n values may be encoded or computed at the same time. In other words, when the slot encoding is performed, parallel computation may be performed on the homomorphic ciphertext. The slot encoding method may vary depending on the homomorphic encryption algorithm. The above-described CKKS scheme may perform the slot encoding using a fast Fourier transform (FFT).

The coefficient encoding is a method of converting data to be encrypted into a polynomial form and converting coefficients of the polynomial into encrypted values. The above-described CKKS scheme may perform the coefficient encoding by converting real number data into an integer and adding the integer to the coefficient of the polynomial or by using a discrete Fourier Transform (DFT) in a state in which the slot encoding is performed.

According to an embodiment of the disclosure, the electronic device 100 may perform CinS encoding. The CinS encoding refers to a method of performing encoding by performing the DFT on a plurality of slot sections instead of the entire slot after performing the slot encoding. This will be described in detail in the following description.

Data encoded using the CinS encoding method is referred to as CinS-encoded data in the disclosure. The electronic device 100 transmits, to the server device 200, the homomorphic ciphertext obtained by performing the homomorphic encryption 2 on the CinS-encoded data.

The server device 200 is a device for performing computation on the homomorphic ciphertext (that is, at least one homomorphically encrypted image) provided from an electronic device 100 in a homomorphically encrypted state and providing an encryption computation result. The server device 200 may be implemented in various forms such as a web server and a cloud server.

The server device 200 may store an AI model 221 for performing computation in an encrypted state. In a case of receiving an image and performing computation based on the image as described above, the AI model 221 may be a convolutional neural network (CNN), but is not necessarily limited thereto.

Specifically, the AI model 221 may perform various types of computation on the homomorphic ciphertext encrypted with a homomorphic encryption technology (for example, the CKKS scheme) and output a computation result in the form of a homomorphic ciphertext. Hereinafter, the computation result output in the form of a homomorphic ciphertext is referred to as the encryption computation result.

In a case where the AI model 221 is implemented by the CNN, the AI model 221 of the server device 200 performs depth-wise convolutional computation or convolutional computation on the homomorphic ciphertext transmitted from the electronic device 100 by using a model parameter. Such a computation method will be described in detail in the following description.

The server device 200 transmits the encryption computation result to the electronic device 100 through the network 10. The electronic device 100 may perform decryption 3 on the received encryption computation result and provide a computation result 4 to the user. A method of providing the result may vary depending on the type and configuration of the electronic device 100. For example, in a case where the electronic device 100 includes a built-in display or is connected to an external display (for example, a monitor), the decrypted computation result 4 may be displayed. As another example, in a case where the electronic device 100 includes a speaker, a voice message corresponding to the computation result may be output through the speaker. As still another example, in a case where the electronic device 100 performs communication with another terminal device (for example, a smartphone), the decrypted computation result may be transmitted to the terminal device. In a case where the AI model 221 is a model trained to diagnose a disease, the computation result may include information regarding the presence or absence of the disease, a type of the disease, a progress of the disease, or the like diagnosed based on the image 1 of the user.

Figure 2:
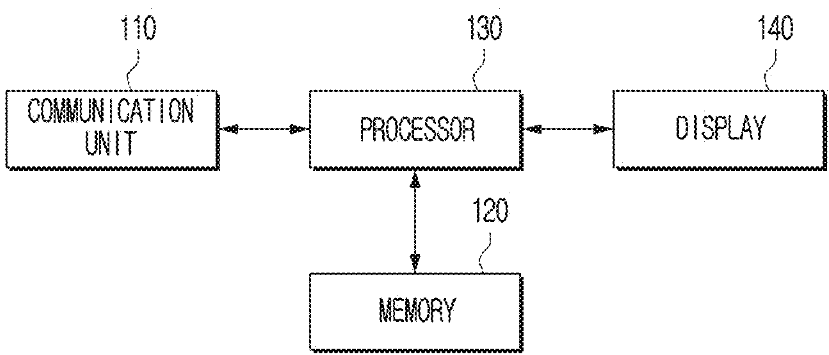
FIG. 2 is a block diagram illustrating a configuration of the electronic device according to at least one embodiment of the disclosure.

FIG. 2 is a block diagram illustrating the configuration of the electronic device according to at least one embodiment of the disclosure. Referring to FIG. 2, the electronic device 100 includes a communication unit 110, a memory 120, a processor 130, and a display 140.

The communication unit 110 is a component for performing communication with various external devices including the server device 200. The communication unit 110 may transmit and receive various signals and data to and from an external device through various wired and wireless communication manners such as wired/wireless local area network (LAN), wide area network (WAN), Ethernet, IEEE 1394, Bluetooth, access point (AP)-based Wi-Fi (wireless LAN network), Zigbee, high-definition multimedia interface (HDMI), universal serial bus (USB), mobile high-definition link (MHL), audio engineering society/European broadcasting union (AES/EBU), an optical manner, and a coaxial manner. For example, the communication unit 110 may also receive an image captured by an external camera.

The memory 120 is a component for storing various programs, data, instructions, and the like required for an operation of the electronic device 100. The memory 120 may be implemented as at least one of various memories such as a dynamic RAM (DRAM), a static RAM (SRAM), a synchronous dynamic RAM (SDRAM), a one time programmable ROM (OTPROM), a programmable ROM (PROM), an erasable and programmable ROM (EPROM), an electrically erasable and programmable ROM (EEPROM), a mask ROM, a flash ROM, a flash memory, a hard disk drive, and a solid state drive (SSD).

The memory 120 may store an image received through the communication unit 110 or an image taken or drawn by the electronic device 100.

The display 140 is a component for displaying various screens under the control of the processor 130. In FIG. 2, the display 140 is illustrated as a component included in the electronic device 100, but the display 140 is not limited thereto. The electronic device 100 may also be used while being connected to a display device (for example, a monitor, a TV, or a beam projector) provided separately from the electronic device 100.

The processor 130 is a component for controlling an overall operation of the electronic device 100. The processor 130 may perform various operations based on a command, a program, data, or the like stored in the memory 120.

The processor 130 may be implemented by a digital signal processor (DSP) or a microprocessor processing a digital signal. However, the processor 140 is not limited thereto, and may include one or more of a central processing unit (CPU), a micro controller unit (MCU), a micro processing unit (MPU), a controller, an application processor (AP), a communication processor (CP), an ARM processor, a graphics processing unit (GPU), a neural processing unit (NPU), and an artificial intelligence (AI) processor or may be defined by these terms. In addition, the processor 130 may be implemented by a system-on-chip (SoC) or a large scale integration (LSI) in which a processing algorithm is embedded or may be implemented in the form of a field programmable gate array (FPGA).

The CPU is a general-purpose processor that may perform not only general computation but also artificial intelligence computation, and may efficiently execute a complex program through a multi-layer cache structure. The CPU is advantageous in a serial processing method that enables organic linkage between the previous calculation result and the next calculation result through sequential calculations.

The GPU is a processor for large-scale computation such as floating point computation used in graphic processing, and may perform large-scale computations in parallel by integrating a large number of cores. In particular, the GPU may be more advantageous in a parallel processing method such as the convolutional computation than the CPU. Further, the GPU may be used as a co-processor to supplement a function of the CPU.

The NPU is a processor specialized in artificial intelligence computation using an artificial neural network, and each layer included in the artificial neural network may be implemented by hardware (for example, silicon). At this time, the NPU is designed to be specialized according to required specifications of a company, and thus has a lower degree of freedom compared to the CPU or the GPU, but the NPU may efficiently perform the artificial intelligence computation requested by the company. Meanwhile, as the processor specialized in the artificial intelligence computation, the NPU may be implemented in various forms such as a tensor processing unit (TPU), an intelligence processing unit (IPU), and a vision processing unit (VPU). An artificial intelligence processor is not limited to the above-described examples unless being specified as the NPU.

In addition, the processor 130 may be implemented by a system on chip (SoC). At this time, the SoC may further include the memory 120 and a network interface such as a bus for data communication between the processor 130 and the memory 120 in addition to one or more processors 130.

The processor 130 may receive various processing commands for at least one image stored in the memory 120 from the user. For example, in a case where the display 140 of the electronic device 100 includes a touch screen, the user may touch an application icon on the display 140 to confirm the stored image. The processor 130 executes an application corresponding to the touched icon and displays an execution screen thereof on the display 140.

Alternatively, the user may select at least one image stored in the memory 120 and then select a menu to obtain an AI model computation result for the image. When such a menu is selected, the processor 130 controls the communication unit 110 to transmit the selected images in a homomorphically encrypted form to the server device 200.

In this case, the processor 130 may perform an encoding task for the homomorphic encryption. The types of the encoding may be various as described above.

Figure 3:
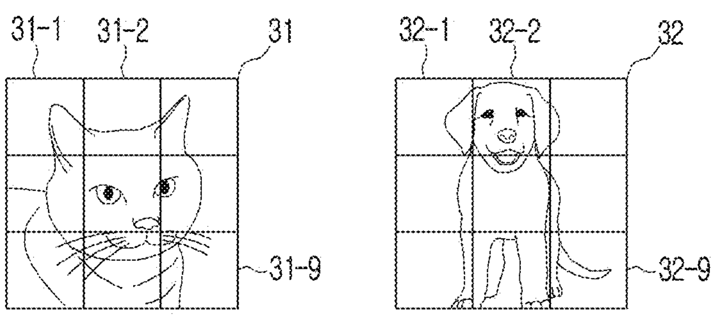
FIGS. 3 to 5 are diagrams for describing various methods of encoding a plurality of images in the electronic device of FIG. 2.
Figure 3:
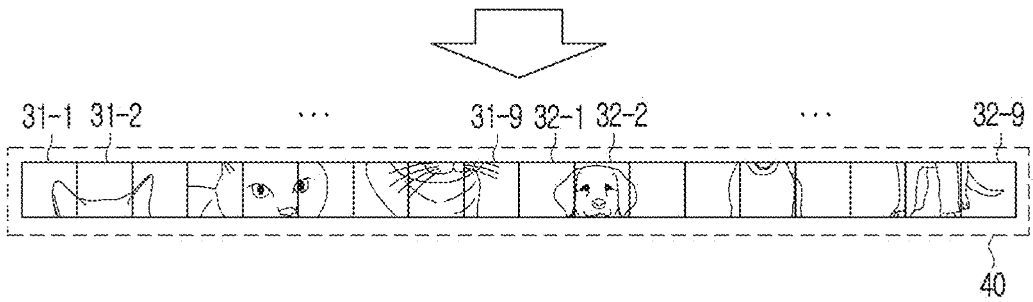
Figure 4:
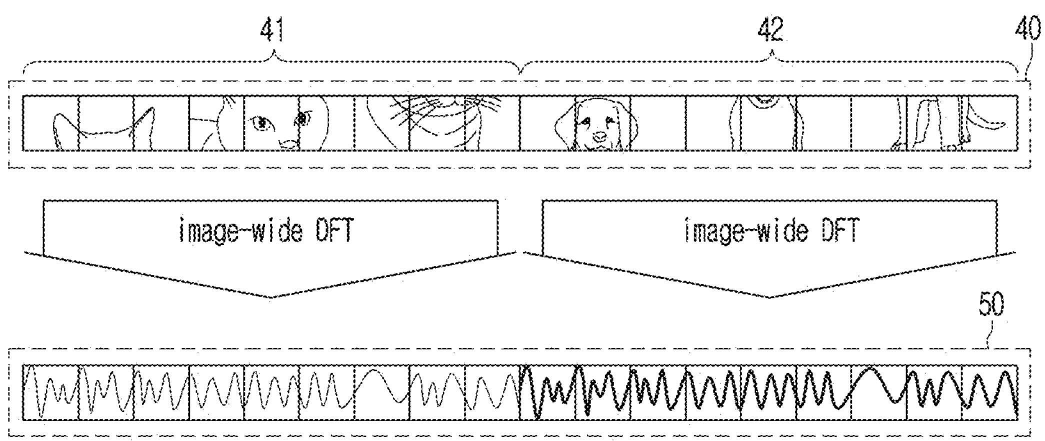
Figure 5:
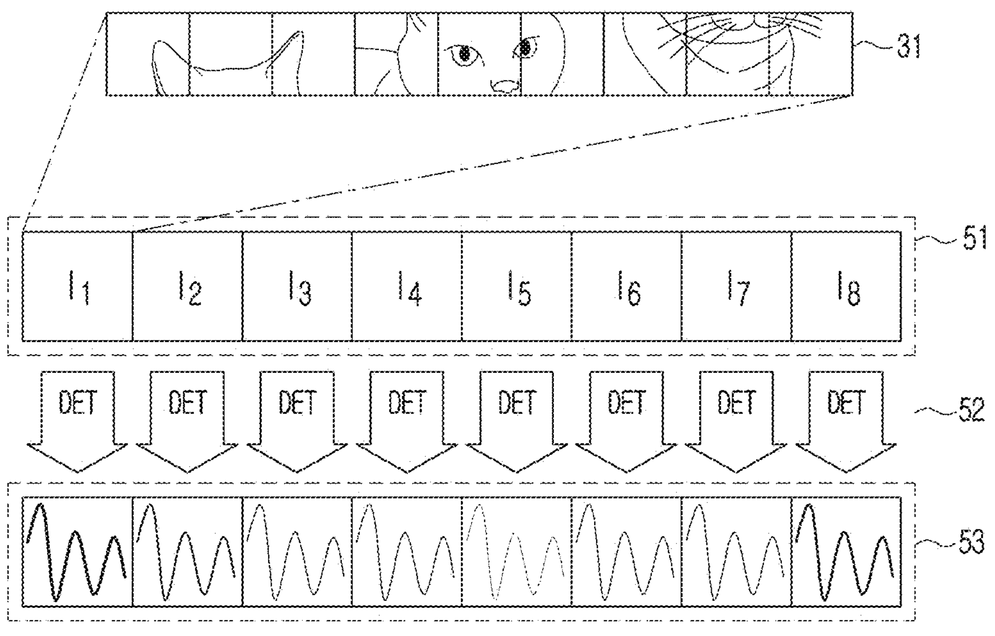

FIGS. 3 to 5 are diagrams for specifically describing a case of performing the CinS encoding among the above-described types of encoding.

FIG. 3 illustrates a method of performing the slot encoding on two images 31 and 32. Referring to FIG. 3, the processor 130 divides the plurality of images 31 and 32 to be transmitted into a plurality of divided images 31-1 to 31-9, and 32-1 to 32-9, respectively. The processor 130 lists all of the divided images 31-1 to 31-9, and 32-1 to 32-9 in the form of a one-dimensional vector and then performs the slot encoding. Specifically, the slot encoding may be performed by performing the FFT in units of entire slots. In a case where the respective images 31 and 32 are m and m', a slot encoding operation of FIG. 3 may be expressed by the following mathematical formula.

$$\langle m\rangle_{slot}\cdot\langle m'\rangle_{slot}=\langle m\odot m'\rangle_{slot}$$ ⟨Mathematical Formula 1⟩

FIG. 4 is a diagram for describing a method of obtaining the CinS-encoded data using slot-encoded data 40 as in FIG. 3. Referring to FIG. 4, the processor 130 performs the DFT in units of slots 41 and 42 corresponding to the respective images in the slot-encoded data. DFT results of the entire slots may be expressed by the following mathematical formula.

⟨Mathematical Formula 2⟩

$$\left|\begin{array}{l}\langle DFT(m_0)|DFT(m_1)\rangle_{slot}\cdot\langle DFT(m'_0)|DFT(m'_1)\rangle_{slot}=\\ \langle DFT(m_0*_{part}m'_0)|DFT(m_1*_{part}m'_1)\rangle_{slot}\end{array}\right.$$

As a result, CinS-encoded data 50 in the form of a frequency signal may be obtained. The CinS-encoded data 50 may be expressed by the following mathematical formula.

$$\langle m\rangle_{CinS}\cdot\langle m'\rangle_{CinS}=\langle m_0*_{part}m'_0|m_1*_{part}m'_1\rangle_{CinS}$$ ⟨Mathematical Formula 3⟩

As described above, when the coefficient encoding is performed in units of images within the entire slots after the slot encoding, image-wise convolutional computation may be made possible in the AI model 221.

In FIGS. 3 and 4, a case where a plurality of images (for example, two images) are included in one ciphertext is illustrated and described, but the above-described CinS encoding may also be applied to a case where a varying number of images are included in one ciphertext.

FIG. 5 is a diagram for describing the CinS encoding method in a case where a plurality of images are included in one ciphertext. Referring to FIG. 5, a DFT 52 is performed on each slot group for slot-encoded data 51 such that one image 31 is included in one slot group I1 including at least one slot, thereby expressing CinS-encoded data 53. The CinS-encoded data 53 in FIG. 5 may be expressed by the following mathematical formula.

⟨Mathematical Formula 4⟩

$$\langle m\rangle_{CinS}\cdot\langle m'\rangle_{CinS}=\langle m_0*_{part}m'_0|m_1*_{part}m'_1|\ \dots\ |m_{C-1}*_{part}m'_{C-1}\rangle_{CinS}$$

In Mathematical Formula 4, C may be a slot group corresponding to each image.

The processor 130 may perform the homomorphic encryption on the CinS-encoded data to obtain the homomorphic ciphertext.

The homomorphic ciphertext may be generated by encrypting a plaintext message using a public key. The homomorphic ciphertext may be generated in a form that satisfies the following property when decrypted using a secret key.

$$Dec(ct,sk)=\langle ct,sk\rangle=M+e(\bmod q)$$ ⟨Mathematical Formula 5⟩

Here, <,> means a usual inner product, ct means the ciphertext, sk means the secret key, M means the plaintext message, e means an encryption error value, and mod q means a modulus of the ciphertext. q needs to be selected such that a scaling factor (Δ) is larger than a result value M multiplied by the message. In a case where an absolute value of the error value e is sufficiently smaller than M, a decrypted value M+e of the ciphertext is a value that may replace an original message with the same precision in significant digit computation. In the decrypted data, the error may be positioned on a least significant bit (LSB) side, and M may be positioned on a next least significant bit side.

The public key, the secret key, and the like are required to perform the homomorphic encryption. The processor 130 may generate and use the public key required for performing the encryption on its own, or may receive and use the public key from an external device. For example, another terminal device performing decryption may generate each of the public key and the secret key, and then distribute the public key to other devices.

A method of generating the public key and the private key may be implemented in various ways. For example, the processor 130 may generate the public key by using a Ring-LWE technique. Specifically, the processor 130 may first set various parameters and rings and store the parameters and rings in the memory 120. Examples of the parameters may include a length of plaintext message bits and sizes of the public key and the secret key.

The ring may be expressed by the following mathematical formula.

$$R=\mathbb{Z}_q[x]/(f(x))$$ ⟨Mathematical Formula 6⟩

Here, R is the ring, $Z_q$ is a coefficient, and f(x) is an n-th polynomial.

The ring means a set of polynomials having preset coefficients, where addition and multiplication are defined between elements, and the set is closed under the addition and the multiplication.

For example, the ring means a set of n-th polynomials whose coefficient is $Z_q$. Specifically, when n is Φ(N), the ring means an N-th cyclotomic polynomial. (f(x)) represents an ideal of $Z_q[x]$ generated by f(x). An Euler's totient function Φ(N) means the number of natural numbers that are coprime to N and smaller than N. In a case where $\Phi_N(x)$ is defined as the N-th cyclotomic polynomial, the ring may also be expressed as the following Mathematical Formula 7.

$$R=\mathbb{Z}_q[x]/(\Phi_N(x))$$ ⟨Mathematical Formula 7⟩

The secret key sk may be expressed as follows.

The ring of Mathematical Formula 6 described above may have a complex number in a plaintext space. Meanwhile, among the above-described sets of the ring, only a set whose plaintext space is a real number may be used in order to improve a computation speed for the homomorphic ciphertext.

When the ring is set, the processor 130 may calculate the secret key sk from the ring.

$$sk \leftarrow (1, s(x)), s(x) \in R \quad \langle\text{Mathematical Formula 8}\rangle$$

Here, s(x) means a polynomial randomly generated with a small coefficient.

Further, the processor 130 may calculate a first random polynomial (a(x)) from the ring. The first random polynomial may be expressed as follows.

$$a(x) \leftarrow R \quad \langle\text{Mathematical Formula 9}\rangle$$

In addition, the processor 130 may calculate the error. Specifically, the processor 130 may extract the error from a discrete Gaussian distribution or a distribution that is statistically close to the discrete Gaussian distribution. Such an error may be expressed as follows.

$$e(x) \leftarrow \mathcal{D}^n_{\alpha q} \quad \langle\text{Mathematical Formula 10}\rangle$$

Once the error is calculated, the processor 130 may perform modular computation of the error for the first random polynomial and the secret key to calculate a second random polynomial. The second random polynomial may be expressed as follows.

$$b(x) = -a(x)s(x) + e(x)(\text{mod } q) \quad \langle\text{Mathematical Formula 11}\rangle$$

Finally, the public key pk is set as follows in a form including the first random polynomial and the second random polynomial.

$$pk = (b(x), a(x)) \quad \langle\text{Mathematical Formula 12}\rangle$$

The above-described key generation method is only an example, and is not necessarily limited thereto, and it is a matter of course that it is possible to generate the public key and the secret key in other ways.

The processor 130 transmits the homomorphic ciphertext encrypted in the above-described manner to the server device 200 through the communication unit 110.

When the processor 130 receives the encryption computation result of the AI model for the homomorphic ciphertext through the communication unit 110, the processor 130 may decrypt the encryption computation result using the above-described secret key. The processor 130 may display the decrypted computation result on the display 140. In a case where the transmitted image is a test photograph of the body of the user, and the AI model 221 is a model trained for cancer diagnosis, the computation result may include information regarding whether or not the user has a cancer, information regarding a cancerous part of the body in a case where the user has a cancer, information regarding the stage of a cancer, or the like based on comparison between the test photograph of the user and reference data. However, such a computation result does not necessarily have to be used for health checkups, and may be utilized for various purposes depending on a type of the AI model 221.

Meanwhile, in a case where the above-described CinS encoding is performed, the AI model 221 may perform the image-wise convolutional computation, and thus, efficiency of the convolutional computation may be greatly increased. FIG. 6 is a table illustrating an effect when the CinS encoding is performed according to an embodiment of the disclosure.

In FIG. 6, C represents the number of each image or slot group corresponding to the image, and f represents a CNN filter size. Referring to FIG. 6, in a case where the slot encoding is performed, the number of rotations is $2f^2+2C-4$, and one bootstrapping level is consumed, and in a case where the coefficient encoding is performed, the number of rotations is C−1, and one bootstrapping level is consumed. On the other hand, in a case where the CinS encoding is performed, the number of rotations is reduced to $2\sqrt{C}-2$, and 0 bootstrapping level is consumed.

The bootstrapping level is a level for distinguishing a size of the plaintext space up to a state where bootstrapping needs to be performed. That is, in a case of performing computation using the homomorphic ciphertext, an approximate message weight in the ciphertext obtained as a result of each computation changes.

In a case where the homomorphic ciphertext is generated in the form of Mathematical Formula 5 described above, when q is smaller than M, M+e(mod q) has a different value from M+e, making decryption impossible. Therefore, the value of q needs to always be maintained larger than M. However, as the computation progresses, the value of q gradually decreases. Therefore, an operation for changing the value of q such that the value of q is always larger than M is required. Such an operation is called rebooting or bootstrapping. Alternatively, such an operation may be called a plaintext space expansion operation. In a case where the bootstrapping level is 1, the number of times the bootstrapping needs to be performed is reduced as a result. On the other hand, in a case of performing the CinS encoding, the bootstrapping level is 0, and thus, the number of times the bootstrapping needs to be performed may not be increased. In addition, the number of rotations is also reduced as compared to other encoding methods. As a result, it is possible to perform the image-wise convolutional computation at low cost, and thus, performance of the AI model 221 of the server device 200 may be improved.

Figure 7:
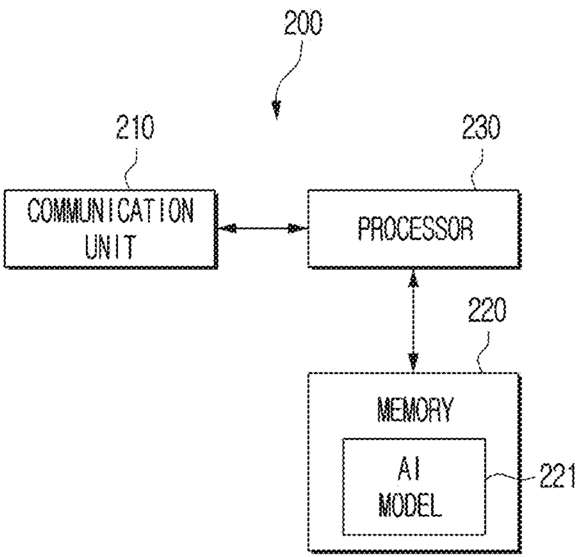
FIG. 7 is a block diagram illustrating a configuration of a server device according to at least one embodiment of the disclosure.

FIG. 7 is a block diagram illustrating a configuration of the server device according to at least one embodiment of the disclosure. Referring to FIG. 7, the server device 200 includes a communication unit 210, a memory 220, and a processor 230. An overlapping description of operations and examples of components of FIG. 7 that are identical or similar to those described in FIG. 2 will be omitted.

The communication unit 210 is a component for receiving various signals or data transmitted from the electronic device 100. The communication unit 210 may receive, from the electronic device 100, the homomorphic ciphertext that is homomorphically encrypted after performing the CinS encoding on at least one image.

The memory 220 may store the AI model for performing computation in an encrypted state, at least one model parameter of the AI model, and the like.

The processor 230 inputs the homomorphic ciphertext received from the electronic device 100 into the AI model 221 to obtain the encryption computation result. The processor 230 transmits the obtained encryption computation result to the electronic device 100 through the communication unit 210.

The AI model 221 may be implemented in various forms. As described above, the AI model 221 may be implemented as the CNN for computation on an image.

The AI model 221 implemented as the CNN includes a convolution layer, a pooling layer, a fully connected layer, and an activation function layer.

The convolution layer performs most computations on the input data. In a case where color image data is input to the AI model 221, the image data may be configured as a three-dimensional pixel matrix structured with a height, a width, and channels (height*width*channel). The channels correspond to R, G, and B, respectively. In the convolution layer, the convolutional computation using an allocated filter may be performed for each channel of the input image data to generate an output image.

The convolutional computation includes not only general convolutional computation but also depth-wise convolutional computation. The depth-wise convolutional computation means convolutional computation performed by applying a filter trained separately for each channel.

Figure 8:
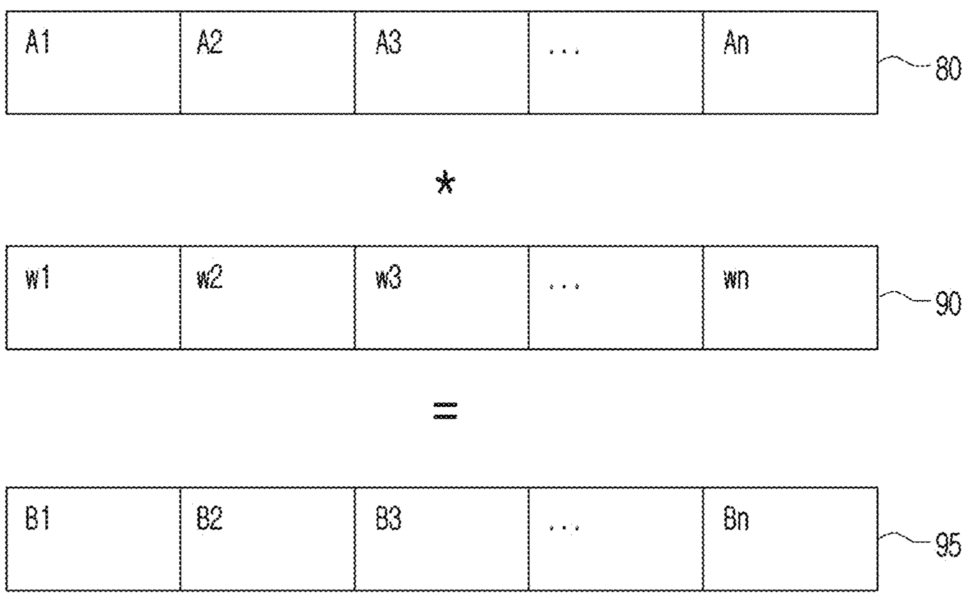
FIGS. 8 and 9 are diagrams for describing various examples of a convolutional computation process of an artificial intelligence (AI) model of the server device of FIG. 7.
Figure 9:
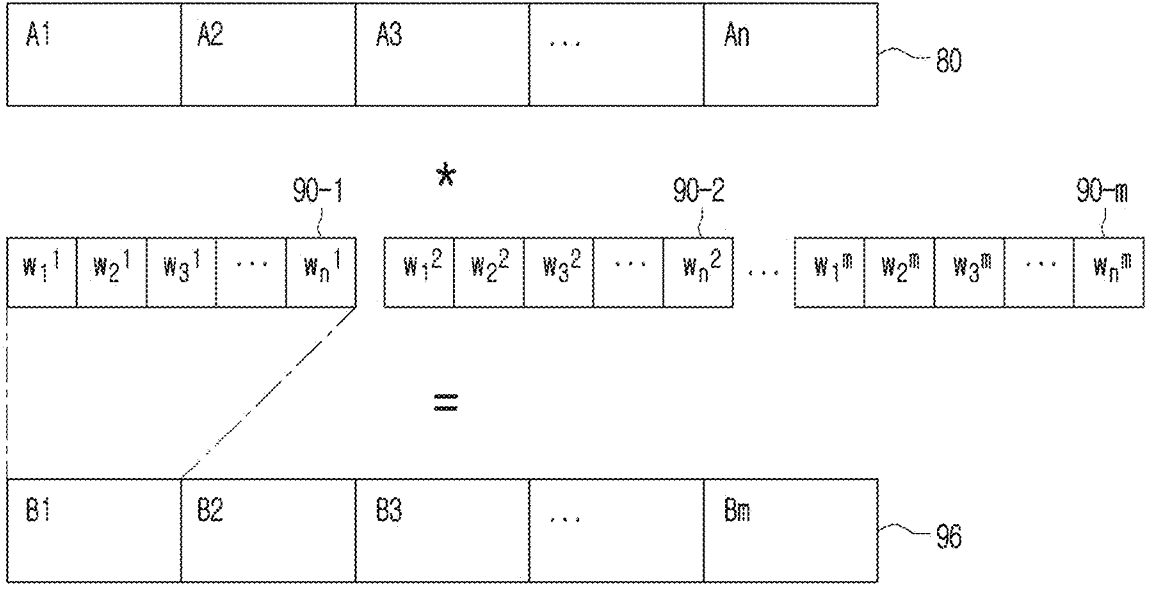

FIGS. 8 and 9 are diagrams for describing various examples of a convolutional computation process of the AI model of the server device of FIG. 7.

Specifically, FIG. 8 is a diagram illustrating a process of performing the depth-wise convolutional computation. A received homomorphic ciphertext 80 in FIG. 8 is a homomorphic ciphertext that is homomorphically encrypted after the CinS encoding for a plurality of images or channels. Therefore, the homomorphic ciphertext 80 may include a total of n slots A1 to An.

The processor 230 may obtain results (B1, B2, . . . , and Bn) 95 of the depth-wise convolutional computation by performing the convolutional computation (A1*w1, A2*w2, . . . , and An*wn) with each slot group of the homomorphic ciphertext by using filters 90 whose number corresponds to the number of entire slot groups among the model parameters stored in the memory 220. As described above, since the CinS encoding is performed, the same result as that of performing the entire depth-wise convolutional computation may be obtained by individual convolutional computation between each slot and the filter.

FIG. 9 is a diagram illustrating a process of performing normal convolutional computation. The received homomorphic ciphertext 80 in FIG. 9 is a homomorphic ciphertext that is homomorphically encrypted after the CinS encoding for a plurality of images as described in FIG. 8. Therefore, the homomorphic ciphertext 80 may include a total of n slot groups A1 to An.

The processor 230 may obtain data of results (B1 to Bm) 96 of the convolutional computation by performing the convolutional computation using a plurality of model parameters 90-1 to 90-*m* corresponding to a plurality of output channels among the model parameters stored in the memory 220 and the entire slot groups A1 to An of the received homomorphic ciphertext.

The data of the results of the convolutional computation may be expressed as the following mathematical formula.

$$Bi = \sum_{k=1}^{n} Ak * Wk^{i} \quad \text{(Mathematical Formula 13)}$$

In the mathematical formula, B is the convolutional computation result, Ak is an data of the k-th slot, i is an output channel, $Wk^{i}$ is the k-th model parameter and n corresponds to the total number of slots. The output channel can be a single kernel.

Figure 10:
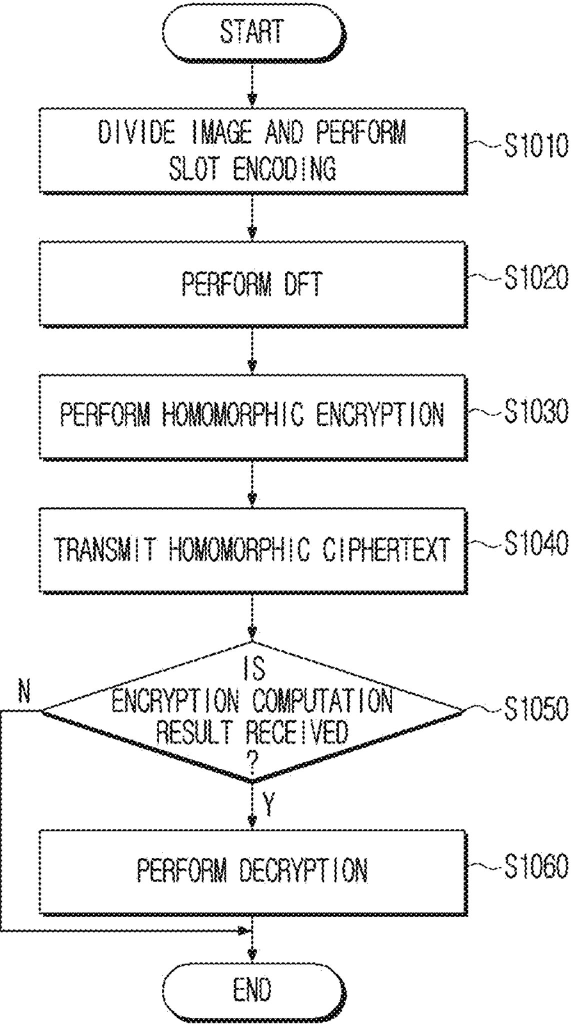
FIG. 10 is a flowchart for describing a data processing method of the electronic device according to at least one embodiment of the disclosure.

FIG. 10 is a flowchart for describing a data processing method of the electronic device according to at least one embodiment of the disclosure.

Referring to FIG. 10, in a case where there is at least one image to be provided to the outside, the electronic device divides the at least one image into a plurality of divided images, lists the entire divided images in the form of a one-dimensional vector, and performs the slot encoding (S1010). Since the image division method and the slot encoding method have been specifically described in the above description, an overlapping description will be omitted.

The electronic device obtains the CinS-encoded data in the form of a frequency signal by performing the DFT on the slot-encoded data in units of slots corresponding to each image (S1020).

The electronic device may obtain the homomorphic ciphertext by homomorphically encrypting the CinS-encoded data (S1030). Since the homomorphic encryption method has been specifically described in the above description, an overlapping description will be omitted.

The electronic device transmits the homomorphic ciphertext to the server device (S1040). Since the AI model that performs computation in an encrypted state is installed in the server device, the server device may input the homomorphic ciphertext into the AI model and perform the encryption computation. The server device may transmit the encryption computation result to the electronic device.

When the encryption computation result is received (S1050), the electronic device may decrypt the encryption computation result by using the previously stored secret key (S1060). In a case where the electronic device does not have the secret key, and another external terminal device has the secret key and has a decryption authority, the electronic device may also transmit the encryption computation result to the terminal device.

When the electronic device performs decryption and obtains the computation result in a plaintext form, the electronic device may provide the computation result to the user in various ways, such as by displaying the computation result or transmitting the computation result to another external terminal device.

The above-described data processing method may be performed by the electronic device illustrated in FIG. 2 described above, but is not necessarily limited thereto and may be performed by devices having various configurations.

Figure 11:
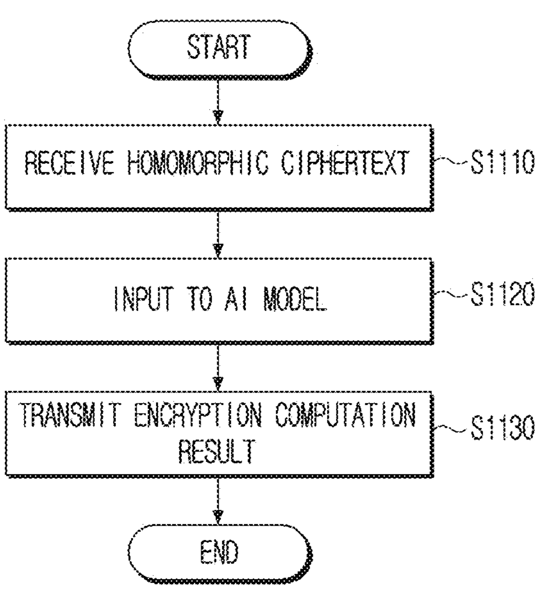
FIG. 11 is a flowchart for describing a data processing method of the service device according to at least one embodiment of the disclosure.

FIG. 11 is a flowchart for describing an encryption processing method of the server device according to at least one embodiment of the disclosure. Referring to FIG. 11, the server device may receive, from the electronic device, the homomorphic ciphertext that is homomorphically encrypted after the CinS encoding for a plurality of images (S1110).

The server device may input the received homomorphic ciphertext into the AI model to obtain the encryption computation result (S1120). The AI model is a model for performing computation in an encrypted state. The AI model may perform convolutional computations and ReLu computations multiple times based on the homomorphic ciphertext and model parameters, extract image features, and output the classified computation result. Since the computation is performed based on the homomorphic ciphertext, such a computation result may also be in the form of the homomorphic ciphertext. The AI model may perform not only the general convolutional computation but also the depth-wise convolutional computation. Since each computation method is described in detail in FIGS. 8 and 9, an overlapping description will be omitted.

The server device transmits the encryption computation result to the electronic device (S1130).

The data processing method of FIG. 11 may be performed by the server device 200 having the configuration illustrated in FIG. 6, but is not necessarily limited thereto, and may be performed by electronic devices having more diverse configurations.

In the above description, various embodiments have been individually described, but each embodiment does not necessarily have to be implemented alone, and may be implemented by being partially or entirely combined with at least one other embodiment.

In addition, a program for performing the various data processing methods described above may be distributed or used while being stored in a non-transitory computer-readable recording medium. The non-transitory computer-readable medium is not a medium that stores data therein for a while, such as a register, a cache, a memory, or the like, but means a medium that semi-permanently stores data therein and is readable by the machine. A specific example of the non-transitory computer-readable medium may include a compact disk (CD), a digital versatile disk (DVD), a hard disk, a Blu-ray disk, a universal serial bus (USB), a memory card, a ROM, or the like.

Although embodiments of the disclosure have been illustrated and described hereinabove, the disclosure is not limited to the abovementioned specific embodiments, but may be variously modified by those skilled in the art to which the disclosure pertains without departing from the gist of the disclosure as disclosed in the accompanying claims. These modifications should also be understood to fall within the scope and spirit of the disclosure.

What is claimed is:

1. An electronic device comprising:

a communication unit configured to perform communication with a server device storing an artificial intelligence (AI) model that performs computation in an encrypted state;

a memory configured to store a plurality of images;

a processor configured to divide each of the plurality of images into a plurality of divided images and list all the divided images in a form of a one-dimensional vector to perform slot encoding, and configured to obtain CinS-encoded data in a form of a frequency signal by performing discrete Fourier transform (DFT) on slot-encoded data in units of slots corresponding to each image and transmit a homomorphic ciphertext obtained by performing homomorphic encryption on the CinS-encoded data to the server device through the communication unit; and a display, wherein the processor is configured to based on an encryption computation result of the AI model for the homomorphic ciphertext is received through the communication unit, decode the encryption computation result and display the decoded encryption computation result on the display.

2. A server device comprising:

a communication unit configured to perform communication with an electronic device;

a memory configured to store an AI model for performing computation in an encrypted state and a model parameter of the AI model; and a processor, wherein the processor is configured to based on a homomorphic ciphertext obtained by performing CinS encoding on a plurality of images and then performing homomorphic encryption is received from the electronic device through the communication unit, obtain an encryption computation result by inputting the homomorphic ciphertext to the AI model and transmit the encryption computation result to the electronic device through the communication unit, and wherein the AI model performs depth-wise convolutional computation or convolutional computation using the model parameter.

3. The server device as claimed in claim 2, wherein the processor is configured to obtain a result of the depth-wise convolutional computation by performing convolutional computation with each slot of the homomorphic ciphertext by using the model parameters whose number corresponds to the number of entire slots of the received homomorphic ciphertext.

4. The server device as claimed in claim 2, wherein the processor is configured to perform the convolutional computation by using a plurality of model parameters corresponding to a plurality of output channels of the AI model and entire slots of the received homomorphic ciphertext based on a mathematical formula:

$$Bi = \sum_{k=1}^{n} Ak * Wk^i,$$

in which B represents a result of the convolutional computation, Ak represents data of a k-th slot, i represents the output channel, $Wk^i$ represents a k-th model parameter of an i-th output channel, and n represents the number of entire slots.

5. A data processing method of an electronic device, the data processing method comprising:

dividing each of a plurality of images into a plurality of divided images and listing all the divided images in a form of a one-dimensional vector to perform slot encoding;

obtaining CinS-encoded data in a form of a frequency signal by performing DFT on slot-encoded data in units of slots corresponding to each image;

obtaining a homomorphic ciphertext by performing homomorphic encryption on the CinS-encoded data;

transmitting the homomorphic ciphertext to a server device storing an AI model that performs computation in an encrypted state; and based on an encryption computation result of the AI model for the homomorphic ciphertext is received, decoding the encryption computation result.

6. A data processing method of a server device, the data processing method comprising:

based on a homomorphic ciphertext obtained by performing CinS encoding on a plurality of images and then performing homomorphic encryption is received from an electronic device, obtaining an encryption computation result by inputting the homomorphic ciphertext to an AI model that performs computation in an encrypted state; and transmitting the encryption computation result to the electronic device, wherein the AI model performs depth-wise convolutional computation or convolutional computation using a model parameter.

7. The data processing method as claimed in claim 6, wherein the obtaining of the encryption computation result includes obtaining a result of the depth-wise convolutional computation by performing convolutional computation with each slot of the homomorphic ciphertext by using the model parameters whose number corresponds to the number of entire slots of the received homomorphic ciphertext.

8. The data processing method as claimed in claim 6, wherein the obtaining of the encryption computation result includes performing the convolutional computation by using a plurality of model parameters corresponding to a plurality of output channels of the AI model and entire slots of the received homomorphic ciphertext based on a mathematical formula $$Bi = \sum_{k=1}^{n} Ak * Wk^i,$$

in which B represents a result of the convolutional computation, Ak represents data of a k-th slot, i represents the output channel, $Wk^i$ represents a k-th model parameter of an i-th output channel, and n represents the number of entire slots.

* * * * *